United States Patent [19]

Ohnuki et al.

[11] Patent Number: 4,574,633

[45] Date of Patent: Mar. 11, 1986

[54] APPARATUS FOR DETECTING TOOL DAMAGE IN AUTOMATICALLY CONTROLLED MACHINE TOOL

[75] Inventors: Yasuhide Ohnuki; Minoru Uchibori, both of Tokorozawa, Japan

[73] Assignee: Citizen Watch Company Limited, Tokyo, Japan

[21] Appl. No.: 576,235

[22] Filed: Feb. 2, 1984

[30] Foreign Application Priority Data

Feb. 4, 1983 [JP] Japan .................................. 58-016233
Feb. 24, 1983 [JP] Japan .................................. 58-028523

[51] Int. Cl.$^4$ ........................ G01H 1/00; G01N 29/00; G06F 15/46
[52] U.S. Cl. ..................................... 73/587; 364/184; 364/474
[58] Field of Search .................. 73/587; 364/474, 508, 364/184, 185

[56] References Cited

U.S. PATENT DOCUMENTS 4,220,995 9/1980 Shoda ................................. 364/474
4,413,507 11/1983 Drew ................................. 73/587
4,456,960 6/1984 Wakai ................................. 364/474
4,475,160 10/1984 Inaba ................................. 364/474

FOREIGN PATENT DOCUMENTS

WO83/03490 10/1983 PCT Int'l Appl. ................. 364/508

Primary Examiner—Howard A. Birmiel
Attorney, Agent, or Firm—Jordan and Hamburg

[57] ABSTRACT

An apparatus for detecting damage to the cutting tool fitted in a machine tool controlled by automatic machining control circuit means such as a microprocessor, which acts to sense the level of acoustic emission generated by the machine tool during machining, compares that level with one of a plurality of different predetermined data values which are stored in a memory circuit, and generates a warning signal if the noise level exceeds the predetermined level. The different data values stored in the memory circuit are respectively utilized for different machining conditions, i.e. different combinations of cutting tool, machining material, feed rate, etc.

5 Claims, 8 Drawing Figures

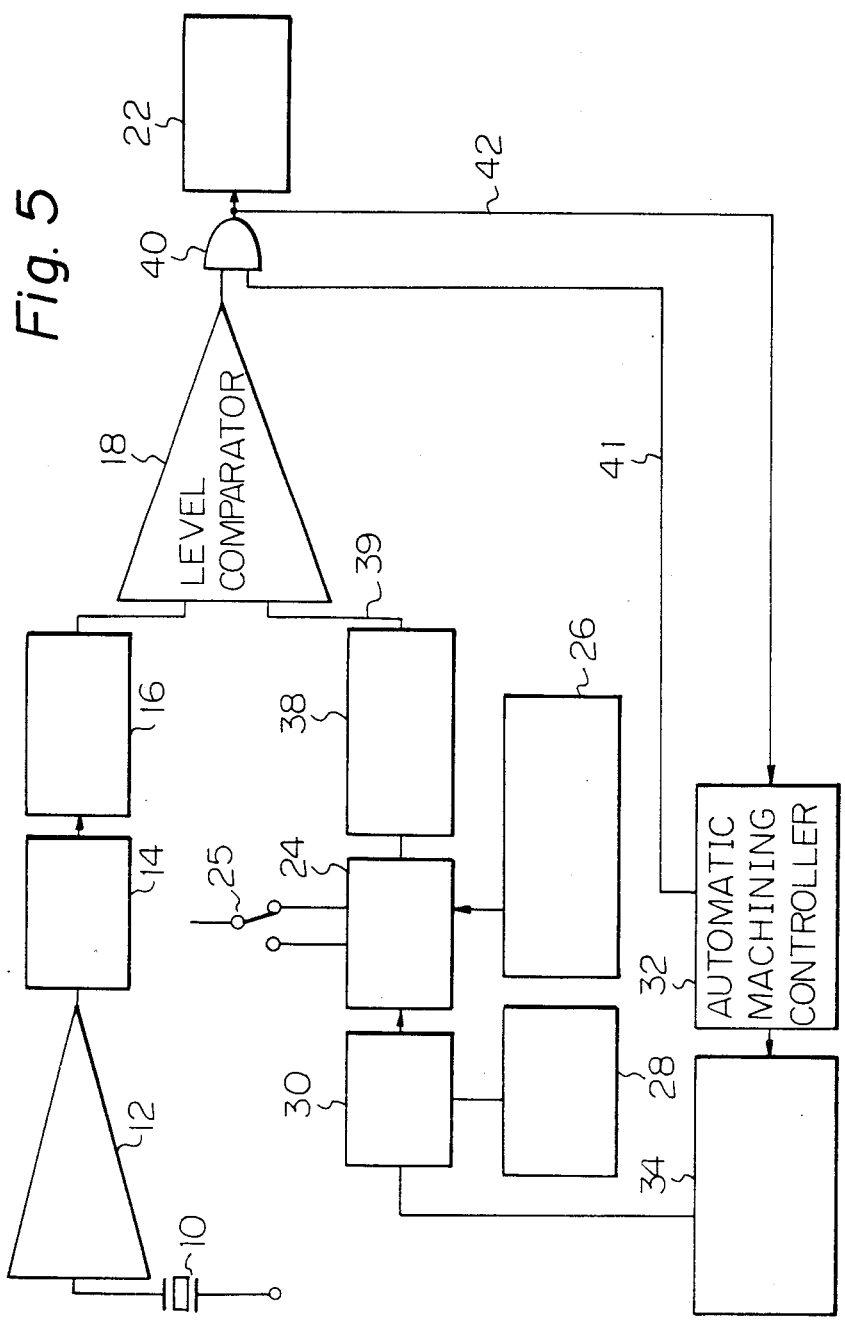

APPARATUS FOR DETECTING TOOL DAMAGE IN AUTOMATICALLY CONTROLLED MACHINE TOOL

BACKGROUND OF THE INVENTION

Machine tools of various types, controlled by automatic machining control circuit means such as computers or microprocessors, are now widely utilized. Such machine tools offer considerable advantages with respect to enhancing automation of manufacturing processes with reduced manpower being required. However with prior art types of such machine tool, the automatic machining control circuit means are not capable of detecting when the cutting tool fitted to the machine tool has been damaged, and so will not perform proper machining and may in fact damage the workpiece. There is therefore a requirement for means to sense such tool damage in an automatic manner, and to use the results of such sensing to notify the operating staff by an audible and/or visible warning signal, and moreover to act on the automatic machining control circuit means such as to cause correct countermeasures (e.g. immediate halt of machining operations) to be automatically initiated.

Such tool damage can be sensed in a variety of ways, for example by detecting changes in vibrational acceleration, increased feed drag, etc. However the level of acoustic emission (sometimes abbreviated to AE) generated when a damaged cutting tool is first brought into contact with the workpiece (i.e. when machining feed begins) has been found to provide a highly accurate indication of tool damage.

If only a single type of machining condition is to be anticipated, i.e. only a single type of cutting tool will be used, with a single type of material to be machined, at a fixed feed rate, then it is sufficient simply to convert the energy of the acoustic emission into an electrical signal, to compare this signal level with a predetermined fixed value corresponding to the maximum amount of acoustic emission to be expected so long as there is not cutting tool damage, and generating an alarm signal if this predetermined value is exceeded. However, the level of acoustic emission which is generated during machining operations using an undamaged tool, although substantially constant for any particular combination of machining parameters, can vary substantially between different sets of parameters. That is to say, the "normal" level of acoustic emission for machining using one type of cutting tool may be much higher than the level produced when machining using a different type of cutting tool, and may in fact exceed the acoustic emission level produced for the condition of tool damage when using the latter tool. Thus, if only a single fixed value is used as a detection level for sensing a state of tool damage, it will not be possible to perform damage detection for a variety of different machining conditions.

There is therefore a requirement for an apparatus for sensing damage to the cutting tool of an automatically controlled machine tool, which is applicable to a variety of operating conditions of the machine tool, and it is one object of the present invention to provide such an apparatus.

In addition, various types of electrically or mechanically generated noise may be produced at times other than when machining is in progress, and such noise may be sensed as a high level of acoustic emission, and therefore result in generation of spurious tool damage warning signals. The elimination of such erroneous warning signals is another objective of the present invention.

SUMMARY OF THE INVENTION

The present invention basically comprises sensing means such as an electro-acoustic transducer, mechanically coupled to the machine tool at a suitable position for sensing acoustic emission, connected to processing circuitry for producing an operation monitor signal by amplification and integration of the transducer output signal with a suitable time constant. The operation monitor signal thereby represents the average level of acoustic emission generate during machining. A memory circuit stores a plurality of different discrimination data values, each corresponding to a particular machining condition of the machine tool (i.e. to a specific combination of cutting tool type, machining material, feed rate, etc.) Address signals produced under the control of the automatic machining control circuit means (i.e. computer or microprocessor controlling operation of the machine tool which will be referred to in the following simply as the controller) designate output of a discrimination data value from the memory circuit which corresponds to the current machining condition. This discrimination data value (which would typically be in digital signal form) is converted into a discrimination signal by means such as an D-A converter circuit, and this is compared with the operation monitor signal in a comparator circuit. If the level of the operation monitor signal exceeds the discrimination signal level, then a damage indication signal is generated by the comparator circuit, which results in an audible and/or visible tool damage warning signal being produced from a warning device. In addition, the damage indication signal is input to the controller, which responds by initiating a halt in the machining operation.

Each of the stored discrimination data values in the memory circuit is an optimized value for sensing tool damage in the corresponding machining condition, i.e. selected such as to minimize the possiblity of erroneous damage indication signals being generated for the corresponding machining condition.

Such an apparatus may further include logic gate circuit means controlled by an output signal from the controller which indicates that the machine tool is currently performing a machining operation (i.e. that tool feed is in progress), with this logic gate circuit means controlling the output signal from the comparator circuit such that the damage indication signal can only be output while a machining operation is in progress. These measures eliminate the possibility of erroneous tool damage warning signals being generated due to electrical noise pickup, mechanical shock, etc, affecting the sensor at a time when no machining is taking place.

BRIEF DESCRIPTION OF THE DRAWINGS

FIG. 1A corresponds to initiation of normal machining operation, FIG. 1B to initiation of machining with a damaged cutting tool, using the same tool as in the case of FIG. 1A, and FIG. 1C corresponds to normal operation under a different machining condition, e.g. using a different cutting tool;

FIG. 5 is a block circuit diagram of a second embodiment of the present invention, whereby generation of a damage indication signal is enabled only while machining is in progress.

DESCRIPTION OF THE PREFERRED EMBODIMENTS

Figure 1A:
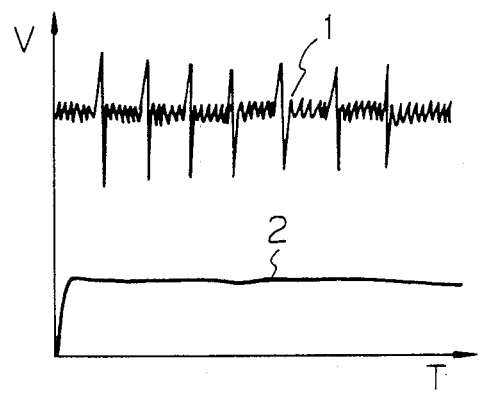
FIGS. 1A, 1B and 1C are diagrams to illustrate typical acoustic emission and operation monitor signal waveforms.
Figure 1B:
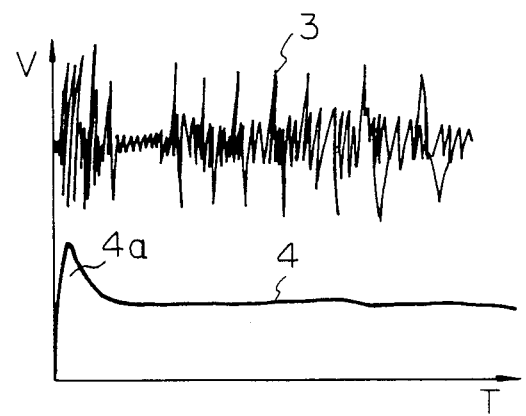

Referring first to FIGS. 1A and 1B, numeral 1 in FIG. 1A illustrates the waveform of an acoustic emission signal produced by a sensor coupled to a machine tool for the case of machining using an undamaged cutting tool, with initiation of tool feed being assumed to occur at time T=0. Numeral 2 denotes a signal produced by time-averaged detection of the sensor output signal, e.g. the output of an envelope detector circuit coupled to receive the sensor signal. This time-averaged signal will be referred to as an operation monitor signal in the following, and as shown, is of relatively flat form during machining using an undamaged cutting tool. FIG. 1B shows corresponding waveforms for the same machining condition, i.e. identical cutting tool, feed rate and machining material, but is for the case of a damaged tool being utilized. In this case, when tool feed begins, then an initial peak or spike 4a appears in the operation monitor signal waveform, as a result of an initial burst of high-energy acoustic emission noise which is produced when the damaged tool is brought into contact with the workpiece. Thus, detection of the tool damage state can be performed by sensing that the level of the operation monitor signal has exceeded a certain predetermined value, i.e. a value which is above the maximum level of the operation monitor signal which can occur during machining with an undamaged tool.

Figure 2:
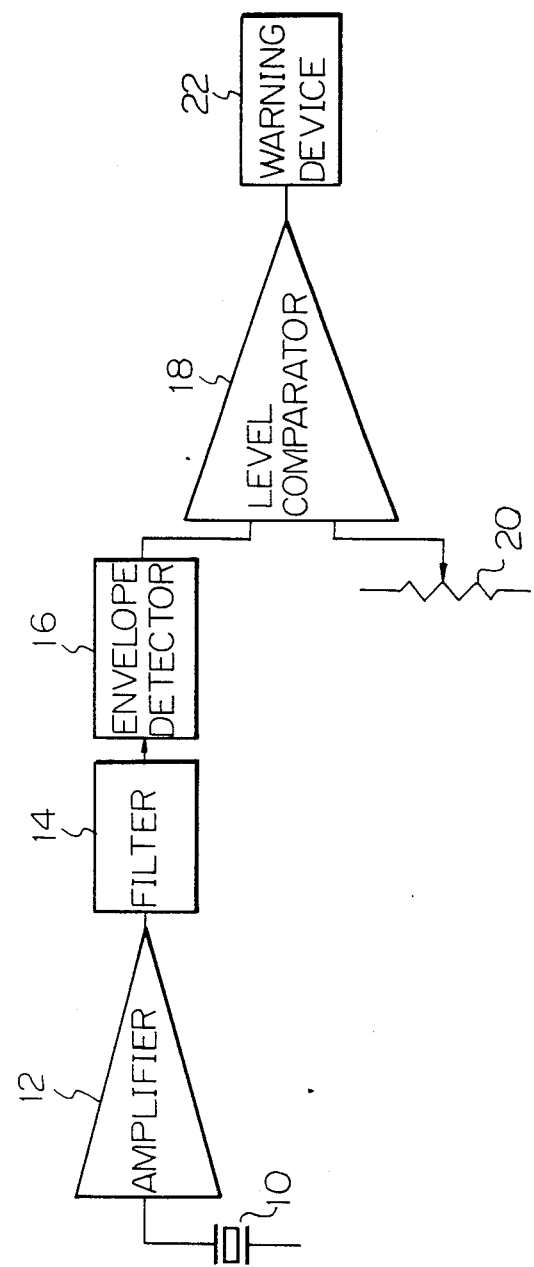
FIG. 2 is a block circuit diagram of a prior art apparatus for detecting tool damage in a machine tool.

A prior art apparatus for performing such detection is shown in FIG. 2. Here, numeral 10 denotes a sensor which is coupled to the machine tool for sensing the acoustic emission produced therefrom, numeral 12 denotes an amplifier providing broad-band amplification by a factor of the order of 40 to 80 dB, for example, and numeral 14 denotes a band-pass filter having a band-pass frequency range of 300 kHz to 1 MHz, for example. This filter serves to eliminate signal components resulting from mechanical vibration, 1/f noise, etc. Numeral 16 denotes an envelope detector, i.e. a combination of an amplifier and integrator circuit, with an integration time constant of the order of several milliseconds. This circuit produces an operation monitor signal, comprising only the lowest-frequency components of the acoustic emission signal, which is applied to one input of a level comparator 18. A predetermined fixed signal level, produced in this example from a presettable potentiometer 20, is applied to the other input of comparator 18. Thus, when the level of the operation monitor signal from envelope detector 16 exceeds the predetermined value from potentiometer 20, an output signal is produced from comparator 18 which actuates a warning device 22 to generate some form of warning signal, to thereby provide notification of the tool damage. That is to say, the predetermined signal value from potentiometer 20 is set to be higher than the maximum level of operation monitor signal which will be produced during machining operations using an undamaged cutting tool, so that only machining using a damaged tool will result in an output signal being produced from comparator 18.

Figure 1C:
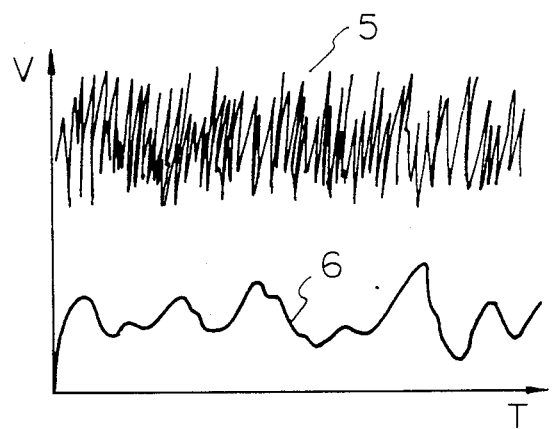

However, if the machining condition is altered, i.e. by fitting a different type of cutting tool in the machine tool, by changing the feed rate of the tool, or changing the type of material being machined, then even of the cutting tool is undamaged, a substantial change in the maximum level of the operation monitor signal may occur. This is illustrated in FIG. 1C, in which the acoustic emission and operation monitor signal waveforms, denoted by numerals 5 and 6 respectively, are assumed to result from use of a cutting tool which is different from that used in the case of FIGS. 1A and 1B, but which is undamaged. As shown, the peak values of the operation monitor signal generated in this case may be equal to or higher than the peak value of operation monitor signal generated when machining is performed using a damaged but different type of cutting tool, i.e. as illustrated in FIG. 1B. It would therefore not be possible to discriminate between a condition of tool damage and a condition of normal machining, if a prior art type of apparatus of the form shown in FIG. 2 were to be utilized in this case.

It can therefore be understood from the above that such a prior type of tool damage sensing apparatus is not applicable to a machine tool which must operate under a variety of different machining conditions, i.e. using different sizes and types of cutting tool, different materials to be machined, different feed rates, etc. Since operation under a wide variety of different machining conditions is a basic advantageous feature of modern automatically controlled machine tools, it will be apparent that a prior art apparatus such as that of FIG. 2 is not suitable for performing tool damage sensing in such a machine tool.

Figure 3:
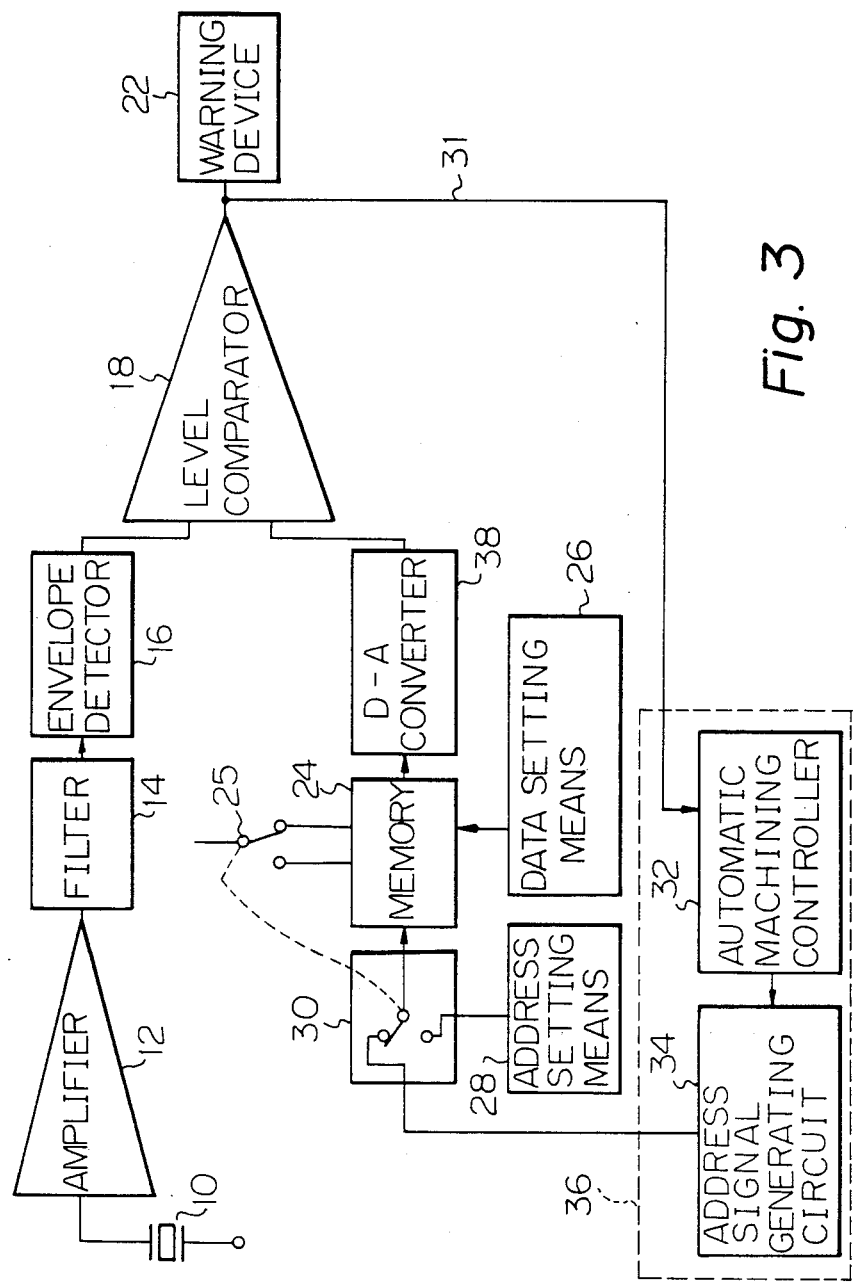
FIG. 3 is a block circuit diagram of a first embodiment of an apparatus according to the present invention.

Referring now to FIG. 3, a first embodiment of an apparatus according to the present invention is shown. Here, sensor 10, amplifier 12, filter 14, envelope detector 16, level comparator 18 and warning device 22 have the same functions as in the apparatus of FIG. 2 described above. Numeral 24 denotes a memory circuit, for storing a plurality of discrimination data values. Memory circuit 24 can be of various forms, but can conveniently comprise a semiconductor type of memory circuit. Numeral 26 denotes data setting means, for setting discrimination data values into memory circuit 24, and numeral 28 denotes address setting means for designating the addresses in memory circuit 24 in which the discrimination data values are stored by data setting means 26. A selector switch 25 is operable to set memory circuit 24 either in a read or a write operating mode. Numeral 32 denotes an automatic machining controller which controls the operation of the machine tool, and may comprise a computer or microprocessor, etc. The automatic machining controller 32 acts to produce signals which indicate the current operating condition of the machine tool, i.e. a specific combination of parameters such as the cutting tool type, material to be machined, tool feed rate, etc, and these signals are input to an address signal generating circuit 34. The address signal generating circuit 34 responds by generating a set of address signals corresponding to the address in memory circuit 24 in which a discrimination data value matched to that current operating condition of the machine tool is stored. The address signals are input to a selector switch 30, and hence transferred to memory circuit 24, if the memory circuit is in the read operating mode. That is to say, selector switches 25 and 30 are linked such that in the read operating mode, as illustrated in FIG. 3, selector switch acts to transfer the address signals to memory circuit 24, while in the write mode, selector switch 30 transfers signals from address setting means 28 to memory circuit 24.

The discrimination data value which is thereby output (e.g. in digital signal form) from memory circuit 24 as designated by the address signals is input to a D-A converter circuit 38 and thereby converted into a discrimination signal which is applied to the other input of level comparator 18. A damage indication signal is produced from comparator 18 if the level of the operation monitor signal exceeds that of the discrimination signal, and is applied over line 18 to automatic machining controller 32, which responds thereto by halting machining operation by the machine tool. At the same time, and audible and/or visible warning signal is generated by warning device 22. In this way, damage to the workpiece by the use of a defective cutting tool is avoided automatically.

It can thus be understood that such an apparatus is applicable to a variety of machining conditions, if the appropriate discrimination data value for each condition is stored beforehand in memory circuit 24 and if automatic machining controller 32 is arranged to generate specific signals corresponding to the current machining condition, which thereby cause corresponding address signals to be input to memory circuit 24 so that the correct discrimination data value is read out therefrom and an optimum discrimination signal level for that machining condition is thereby applied to comparator 28. That is to say, the discrimination signal level for a machining condition in which a large amplitude of acoustic emission is produced during normal operation can thereby be automatically set higher than the discrimination signal level for a machining condition in which a lower amount of acoustic emission is produced during normal operation, thereby ensuring that an increased level of acoustic emission resulting from use of a damaged cutting tool will be reliably sensed for each of the different machining conditions. It will further be apparent that such an apparatus is highly suited to a machine tool whose operation is automated to a very high degree, i.e. such that changes of cutting tool, changes in tool feed rate etc. are carried out under program control, without manual intervention.

In the above description, it has been assumed for ease of description that automatic machining controller 32 and address signal generating circuit 34 are separate from one another. However in the case of a machine tool which is controlled by a computer or microprocessor, it would generally be possible to program the controller such as to perform the functions of address signal generating circuit 34, i.e. to arrange that the address signals are output directly therefrom. Such an integrated configuration is indicated by the broken-line outline 36 in FIG. 3.

Furthermore, it is also possible to use various means to implement memory circuit 24, which can be of semiconductor type (e.g. RAM, PROM, etc) or simply comprise an array of relays, fusible links, etc.

Figure 4A:
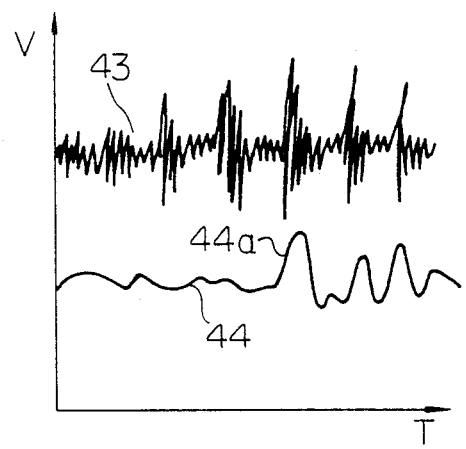
FIGS. 4A and 4B are diagrams to respectively illustrate acoustic emission and operation monitor signal waveforms for a case in which no machining operation is in progress and a case in which machining is initiated using a damage cutting tool.
Figure 4B:
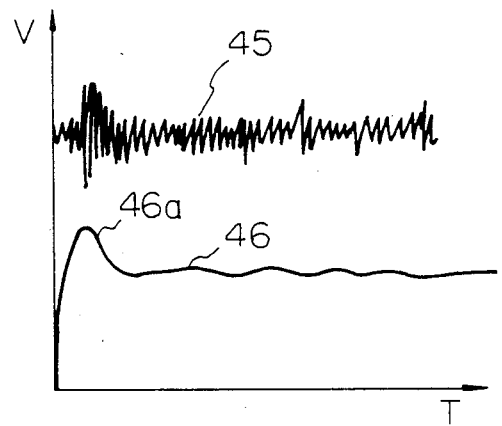

A problem which arises with such an apparatus for sensing tool damage is that various types of noise, produced by electrical interference, mechanical vibration affecting sensor 10, etc., may result in spurious signals being generated by sensor 10 or other parts of the circuitry at times other than while machining is actually in progress. Such signals may cause erroneous signals to be output from comparator 18, causing erroneous tool damage warning signals to be emitted. This problem will be described with reference to the waveform diagrams of FIGS. 4A and 4B. In FIG. 4A, numeral 43 denotes acoustic emission noise which is produced by the machine tool during a period in which no machining is in progress, while numeral 44 denotes the corresponding operation monitor signal which is output from envelope detector 16. As shown, substantially high peak values of operation monitor signal can be produced, such as is indicated by numeral 44a. FIG. 4B shows the corresponding waveforms for the same machine tool, for the case in which machining is initiated using a particular cutting tool which is damaged. As a result, the peak value of the operation monitor signal is as indicated by numeral 46a. However since this peak value is of the same order of amplitude, or lower than, the peak value of the spurious operation monitor signal signals produced at times when machining is not in progress as illustrated in FIG. 4A, it would not be possible to sense a state of tool damage.

FIG. 5 is an embodiment of the present invention which is designed to overcome the problem described above, by ensuring that any output signal from level comparator 18 will only be effective while machining is actually in progress, i.e. while tool feed is taking place. Here, an output signal is produced from automatic machining controller 32, on line 31, which goes to a high logic level potential while tool feed is in progress and remains at a low logic level potential at all other times. This signal is input to one input of an AND gate 40, while the output of level comparator 18 is applied to the other input of AND gate 40. Thus, any erroneous output signals produced by comparator 18 resulting from acoustic emission noise generated at a time when machining is not in progress will be inhibited from transfer through AND gate 40, so that no erroneous damage indication signal will be produced in response to such erroneous outputs. When tool feed is initiated, then AND gate 40 becomes enabled, and if the level of the operation monitor signal from envelope detector 16 increases above the discrimination signal level, then the resultant output signal (i.e. high logic level state) from comparator 18 will be transferred through AND gate 40 and output therefrom as a damage indication signal, on line 42. This signal causes automatic machining controller 32 to halt operation of the machine tool, as in the previous embodiment, and also causes a tool damage warning signal to be emitted by warning device 22.

It will be apparent that it will generally be possible to provide the function of AND gate 40 in the above embodiment integrally with the other functions of automatic machining controller 32, by suitable programming, and that the provision of a physically separate gate is shown only for simplicity of description.

From the above description, it will be understood that the present invention provides an apparatus for providing immediate and reliable indication of damage to a cutting tool used with an automatically controlled machine tool, whereby reduced productivity or damage to workpieces resulting therefrom can be prevented, and further that such an apparatus is highly suited to combination with the controller of such a machine tool, with signals generated by the apparatus acting to halt operation of the machine tool in the event of tool damage being detected.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. An apparatus for generating warning indications of damage to a cutting tool fitted in a machine tool controlled by automatic machining control circuit means, comprising:

sensing means coupled to said machine tool for sensing acoustic emission generated by a machining operation thereof, to thereby produce an operation monitor signal whose amplitude is indicative of a level of said acoustic emission;

memory circuit means, and selector circuit means operable for setting said memory circuit means in a read operating mode and a write operating mode;

data setting means operable while said memory circuit means are functioning in said write operating mode for setting a plurality of discriminations data values into said memory circuit means, respectively corresponding to predetermined machining acoustic emission levels for each of a plurality of different machining conditions of said machine tool, and address setting means operable in said memory write mode for designating the addresses of memory locations in said memory circuit means into which said discrimination data values are respectively set by said data setting means;

address signal generating circuit means controlled by said automatic machining control circuit means for producing address signals corresponding to the address in said memory circuit means of a discrimination data value for a current machining condition of said machine tool, said address signals being input to said memory circuit means while said memory circuit means are functioning in said read operating mode, to designate output of a corresponding discrimination data value therefrom;

signal conversion means for converting said discrimination data value output from said memory circuit means into a discrimination signal;

comparator means for comparing the amplitudes of said operation monitor signal and said discrimination signal and for generating a damage indication signal when a predetermined amount of difference therebetween is attained, indicative of a condition of damage to said cutting tool, said damage indication signal being input to said automatic machining control circuit means, and said automatic machining control circuit means being responsive thereto for halting operation of said machine tool; and warning signal generating circuit means responsive to said damage indication signal from said comparator means for generating a tool damage warning signal.

2. An apparatus according to claim 1, in which said automatic machining control circuit means further produce an operation indication signal while machining operation by said machine tool is in progress, and further comprising logic gate circuit means controlled by said operation indication signal for inhibiting output of said damage indication signal at all times other than when said machining operations are in progress.

3. An apparatus according to claim 1, in which said sensing means comprise a transducer coupled to said machine tool for generating electrical signals in response to accoustic emission generated by machining operations of said machine tool, and signal processing circuit means for converting said transducer output signals into said operation monitor signal.

4. An apparatus according to claim 3, in which said signal processing circuit means comprise a band-pass filter coupled to receive said transducer output signal and an envelope detector circuit coupled to receive an output signal from said filter to thereby generate said operation monitor signal.

5. An apparatus according to claim 1, in which said plurality of different conditions of said machine tool correspond respectively to machining operations using a plurality of different types of said cutting tool.

* * * * *